United States Patent
Tchigevsky

(10) Patent No.: US 8,077,684 B2
(45) Date of Patent: Dec. 13, 2011

(54) PERSONAL AREA NETWORK IMPLEMENTATION WITHIN AN INFRASTRUCTURE NETWORK

(75) Inventor: Izoslav Tchigevsky, Kiryat Haim (IL)

(73) Assignee: Intel Corporation, Santa Clara, CA (US)

( * ) Notice: Subject to any disclaimer, the term of this patent is extended or adjusted under 35 U.S.C. 154(b) by 941 days.

(21) Appl. No.: 11/648,205

(22) Filed: Dec. 29, 2006

(65) Prior Publication Data

US 2008/0159242 A1    Jul. 3, 2008

(51) Int. Cl.
  *H04W 4/00* (2009.01)
(52) U.S. Cl. .......... 370/338; 455/432.1; 455/435.1; 455/436; 455/448
(58) Field of Classification Search .......... 455/436, 455/444, 431, 510, 433, 432.1, 435.1, 448; 370/328, 338, 431, 236.1
See application file for complete search history.

(56) References Cited

U.S. PATENT DOCUMENTS

| | | | |
|---|---|---|---|
| 2002/0045424 A1* | 4/2002 | Lee | 455/41 |
| 2003/0169697 A1* | 9/2003 | Suzuki et al. | 370/310 |
| 2004/0113847 A1* | 6/2004 | Qi et al. | 343/702 |
| 2005/0094588 A1 | 5/2005 | Wentink | |
| 2005/0147071 A1 | 7/2005 | Karaoguz et al. | |
| 2005/0216331 A1* | 9/2005 | Ahrens et al. | 705/11 |
| 2006/0215601 A1* | 9/2006 | Vleugels et al. | 370/328 |
| 2006/0227753 A1 | 10/2006 | Vleugels et al. | |

FOREIGN PATENT DOCUMENTS

| | | |
|---|---|---|
| CN | 101569141 | 10/2009 |
| EP | 2127236 A1 | 12/2009 |
| TW | 200841642 | 10/2008 |
| WO | 02/39674 A1 | 5/2002 |
| WO | 2008/082895 A1 | 7/2008 |

OTHER PUBLICATIONS

Ahmad, M. R., et al., "Multimedia transmission over interworking of Bluetooth WPAN and IEEE 802.11g WLAN networks", *Jointly held with the 2005 IEEE 7th Malaysia International Conference on Communication*, 13th IEEE International Conference, vol. 1, Networks, 2005.,(Nov. 16-18, 2005),380-383.
PCT, International Search Report/Written Opinion for PCT Patent Application No. PCT/US2007/087306 Mailed May 19, 2008,10 Pages.
Mishra et al., "Wireless Multimedia Personal Area Networks: An Overview", Emerging Wireless Multimedia: Services and Technologies, edited by A. K. Salkintzis and N. Passas, Jan. 3, 2006, pp. 169-198.
Office Action received for EP Patent Application No. 07869178.9, mailed on Feb. 7, 2011, 1 page.
European Search Report received for EP Patent Application No. 07869178.9, mailed on Jan. 19, 2011, 8 pages.
International Preliminary Report on Patentability received for PCT Patent Application No. PCT/US2007/087306, mailed on Jul. 9, 2009, 6 pages.

* cited by examiner

*Primary Examiner* — Nick Corsaro
*Assistant Examiner* — Quan Hua
(74) *Attorney, Agent, or Firm* — Thorpe North & Western LLP

(57) ABSTRACT

A wireless device is capable of communicating within a local area network (LAN) and a personal area network (PAN) concurrently, using a single wireless networking module or circuit. A wireless access point within an infrastructure-based network is used to manage the creation, maintenance, and termination of PANs within the LAN framework.

21 Claims, 4 Drawing Sheets ent of the present invention.

PERSONAL AREA NETWORK IMPLEMENTATION WITHIN AN INFRASTRUCTURE NETWORK

TECHNICAL FIELD

The invention relates generally to wireless communication and, more particularly, to techniques for providing PAN functionality within a LAN framework.

BACKGROUND OF THE INVENTION

It is sometimes desirable to be connected to both a local area network (LAN) and a personal area network (PAN) at the same time. This may be the case, for example, when a user wishes to maintain a connection to the Internet through a LAN at the same time that the user accesses computer peripherals in a PAN. In the past, users typically accomplished this by using a different wireless networking module for each type of network (e.g., an IEEE 802.11g card for LAN access and a Bluetooth card for PAN access). However, the use of two different modules can be expensive and can drain energy resources. It would be desirable to have a device that can support both a LAN connection and a PAN connection simultaneously, using just a single wireless networking module.

DETAILED DESCRIPTION

Figure 1:
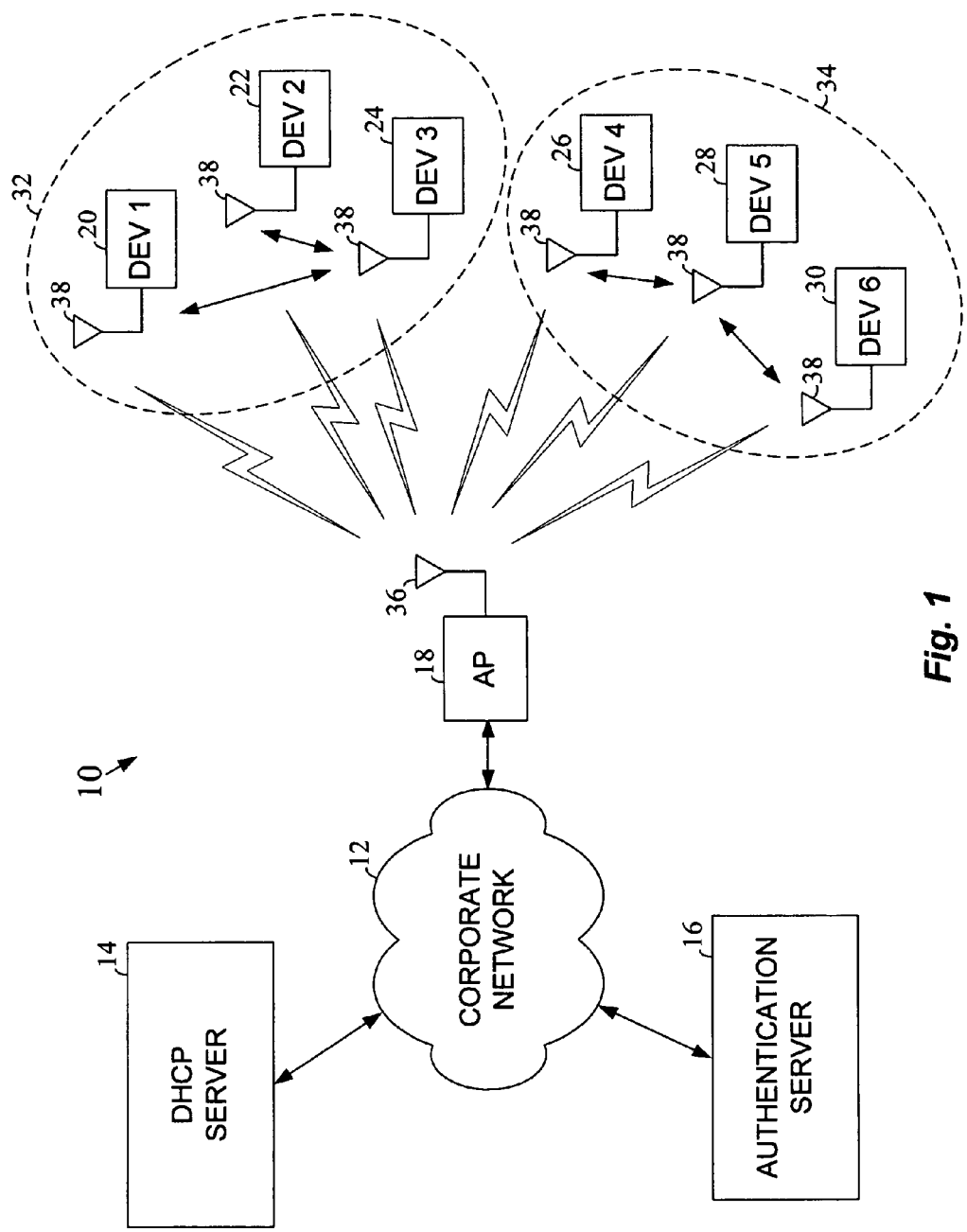
FIG. 1 is a block diagram illustrating an example wireless networking arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to a networking architecture that allows a wireless user device to maintain a simultaneous connection to both a local area network (LAN) and a personal area network (PAN). A wireless access point (AP) is used to provide wireless access to the LAN for one or more wireless user devices within a coverage region thereof. A protocol is implemented that allows one or more wireless devices within range of the AP to request that the AP also establish a PAN for devices in the region. After the PAN has been established, other devices in the region are permitted to join the PAN. Communication between the members of the PAN may occur through the AP or through direct wireless links. Access to the LAN will typically require some level of user authentication. Communication within the PAN, on the other hand, does not require user authentication (or, in some embodiments, requires a lower level of authentication). Communication within the PAN may follow a signaling scheme that is substantially the same as the scheme used within the LAN, with some modifications to identify the signals as PAN traffic. The user devices may each utilize a single wireless networking module to support both LAN and PAN operation.

FIG. 1 is a block diagram illustrating an example wireless networking arrangement 10 in accordance with an embodiment of the present invention. As illustrated, the wireless networking arrangement 10 includes: a corporate network 12, a dynamic host configuration protocol (DHCP) server 14, an authentication server 16, a wireless access point (AP) 18, and a plurality of wireless devices 20, 22, 24, 26, 28, 30. The AP 18 is operative for providing, among other things, wireless access to the corporate network 12 for one or more of the wireless devices 20, 22, 24, 26, 28, 30. As will be described in greater detail, the AP 18 is also operative for managing the creation, maintenance, and termination of personal area networks (PANs) within the region. As shown, the AP 18 may be coupled to one or more antennas 36 to facilitate the transmission and/or reception of wireless signals. Any type of antenna(s) may be used including, for example, a dipole, a patch, a helical antenna, an antenna array, and/or others. Multiple input/multiple output (MIMO) techniques may also be used.

The authentication server 16 provides authentication services for the corporate network 12. That is, the authentication server 16 may determine whether a user or device attempting to access the corporate network 12 is authorized to do so. Any type of authentication may be performed. The DHCP server 14 is operative for, among other things, automatically assigning internet protocol (IP) addresses to devices that are connected to the corporate network 12. In various embodiments, the corporate network 12 may be any type of private or public LAN-type network. The corporate network 12 may be connected to one or more other networks (e.g., the Internet, the public switched telephone network (PSTN), another private or public network, etc.) for providing additional access choices to users.

The wireless devices 20, 22, 24, 26, 28, 30 may include any of a wide variety of different device types. For example, some devices may include: a laptop, desktop, palmtop, or tablet computer having wireless networking functionality, a personal digital assistant (PDA) having wireless networking functionality, a cellular telephone or other handheld wireless communicator, a computer peripheral (e.g., a printer, a scanner, a projector, a data storage device, a cordless mouse, cordless keyboard, cordless speakers, cordless headphones, etc.) having wireless networking functionality, an audio device having wireless networking functionality, a multimedia device having wireless networking functionality, a camera having wireless networking functionality, an appliance having wireless networking functionality, and/or others. Any number of wireless devices may be connected to the AP 18 at a particular point in time. As shown, each of the wireless devices 20, 22, 24, 26, 28, 30 may be coupled to one or more antennas 38 to facilitate the transmission and/or reception of wireless signals. Any type of antenna(s) may be used including, for example, a dipole, a patch, a helical antenna, an antenna array, and/or others.

In various embodiments, the AP 18 and the wireless devices 20, 22, 24, 26, 28, 30 may follow any of a plurality of different wireless networking standards. In at least one embodiment, the AP 18 and the wireless devices 20, 22, 24, 26, 28, 30 are configured in accordance with an IEEE 802.11x wireless networking standard (e.g., in an extended basic service set (EBSS) mode, etc.). The PAN functionality described below may be added to the AP 18 and the devices 20, 22, 24, 26, 28, 30 to operate within the framework of the associated standard. The AP 18 and the wireless devices 20, 22, 24, 26, 28, 30 each include a radio frequency (RF) transceiver subsystem for converting baseband signals to RF transmit signals during transmit operations and to convert RF receive signals to baseband signals during receive operations. The AP 18 and the wireless devices 20, 22, 24, 26, 28, 30 may also each include controller functionality (implemented, for example, within one or more digital processing devices) for performing baseband processing functions and higher level (e.g., MAC, etc.) digital communication functions for the units. Any type of digital processing devices may be used including, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

As illustrated in FIG. 1, each of the wireless devices 20, 22, 24, 26, 28, 30 can maintain a direct wireless link with the AP 18. Some of the devices 20, 22, 24, 26, 28, 30 may be authorized to access the corporate network 12 via AP 18, while others are not. When the AP 18 receives an access request from one of the wireless devices 20, 22, 24, 26, 28, 30 for access to the corporate network 12, the AP 16 may first contact the authentication server 16 to initiate an authentication process to determine whether the device/user is authorized to access the network 12. If the requesting device/user is authenticated by the authentication server 16, the AP 18 may then permit the access.

As used herein, a PAN is a network that typically involves intercommunication between relatively closely spaced devices associated with a single user or a small group of users. In at least one embodiment of the present invention, when a device (or corresponding user) determines that a PAN needs to be established, the device may send a PAN establishment request to the AP 18. The AP 18 may then initiate the PAN and advertise the existence of the PAN within its beacon transmissions and/or probe response messages. Other devices may then join the existing PAN by sending a PAN segment join request to the AP 18. The members of each existing PAN may also be identified within the beacons and/or probe response messages. The device that initially requests the establishment of a PAN is called the PAN host and the devices that later join the PAN are called the PAN clients. For example, with reference to FIG. 1, wireless device 24 may initiate a PAN 32 that is later joined by device 20 and device 22. Device 24 is thus the PAN host of PAN 32 and devices 20 and 22 are the PAN clients. Similarly, wireless device 28 may initiate a PAN 34 that is joined by device 26 and device 30. Device 28 is the PAN host of PAN 34 and devices 26 and 30 are the PAN clients. In at least one implementation, a wireless device may participate in multiple different PAN segments, as either a PAN host or a PAN client.

As described above, to access the corporate network 12, a device/user will typically have to first be authenticated. However, in at least one embodiment of the present invention, authentication is not required for participation within a PAN. That is, a wireless device may initiate or join a PAN and communicate therein without having to first pass an authentication procedure. If a device would also like to communicate with the corporate network 12, however, the device must first be authenticated. In an IEEE 802.11x implementation, the standard 802.11 authentication process may be used. In some other embodiments, a lower level of security may be used within a PAN than is used within the corresponding LAN. At any one time, some of the devices connected to the AP 18 may be communicating with the corporate network 12 but may not be part of a PAN, other devices may be part of a PAN, but not be communicating with the corporate network 12, while still other devices may be simultaneously communicating with the corporate network 12 while also being part of an established PAN. In at least one implementation, the AP 18 will not pass any PAN-segment communications through to the corporate network 12.

In at least one embodiment of the invention, PAN-based communication is only permitted between the PAN host and a PAN client within a PAN segment. That is, PAN-based communication is not permitted between the PAN clients of a PAN. PAN-based communication may occur through the AP 18 and/or by a direct wireless link between members of the PAN. For example, with reference to FIG. 1, PAN host 24 may communicate with PAN client 20 by first sending a packet to the AP 18 which then forwards the packet to device 20 or, in some embodiments, the device 24 may be able to transmit the packet directly to device 20. In an IEEE 802.11x based implementation, the direct link between PAN devices may be established using, for example, the direct link setup (DLS) functionality of IEEE 802.11e.

In one approach, communications within a PAN may utilize a slightly modified version of the signal normally used for the underlying standard. For example, in an IEEE 802.11x based implementation, the PAN communications may use an IEEE 802.11 data packet that has been modified to include a PAN segment ID field that identifies the associated PAN and possibly the destination device. Communications with the conventional LAN may utilize the normal signal format for the standard (e.g., normal IEEE 802.11x packets).

In at least one embodiment of the present invention, access to the wireless medium is achieved in substantially the same manner for a wireless device communicating within a PAN as it is for a device communicating within the LAN. Because the devices that make up a PAN each maintain a wireless connection to the AP 18 and are configured according to the underlying wireless standard, these devices may use the same medium access techniques that the LAN devices would normally use. For example, in an IEEE 802.11x implementation, a carrier sense multiple access with collision avoidance (CSMA/CA) approach may be used. In one such approach, a random backoff interval may be initiated by each device wishing to transmit when a clear channel is detected. If the backoff period for a device expires before a new carrier is detected, the device is permitted to immediately transmit. Acknowledgement messages may also be used when a transmission is successfully received. In another approach, a request-to-send/clear-to-send (RTS/CTS) exchange may be used to reserve the network medium for the subsequent transmission. A network allocation vector (NAV) may be set by other devices in the network to keep track of when the device is not permitted to transmit. Other techniques for managing access to the wireless medium may alternatively be used.

A number of different scenarios may exist for the PAN host and PAN clients of a PAN segment in embodiments of the invention. In one approach, for example, a computer peripheral device may establish a PAN and thus become the PAN host. Computer devices that want to use the peripheral may then join the PAN and communicate with the peripheral using PAN segment communications. With reference to FIG. 1, for example, PAN host 24 may be a printer and PAN clients 20 and 22 may be laptops that want to use the printer. In a similar fashion, PAN host 28 may be a projector in a conference room and PAN clients 26 and 30 may be laptops of users that are giving a presentation using the projector. In another possible approach, a computer may establish a PAN and act as PAN host and the various peripherals that the corresponding user wishes to use may act as the PAN clients. For example, with reference to FIG. 1, the PAN host 24 may be a laptop and PAN clients 20 and 22 may be a printer and a scanner. In still another approach, the PAN host and the PAN clients may be computers or PDAs (or other devices) that wish to communicate with one another without having to pass the network authentication procedure. For example, with reference to FIG. 1, devices 20, 22, and 24 may be laptops of three parties within a conference room that wish to exchange files. Device 24 initiates the PAN as PAN host and devices 20 and 22 then join the PAN as PAN clients. Device 24 is then able to transmit files to and receive files from the devices 20 and 22. None of the devices 20, 22, and 24 need to be authenticated. Other usage scenarios are also possible.

To support PAN operation, a series of PAN management messages may be defined that can be passed between wireless devices and a corresponding AP. In one implementation, for example, the following messages may be used:
 PAN segment establishment request
 PAN segment establishment response
 PAN segment delete request
 PAN segment delete response
 PAN segment join request
 PAN segment join response
 PAN segment leave request
 PAN segment leave response The PAN segment establishment request is sent by a user device to an AP to initially set up a PAN. The PAN segment establishment response is sent by the AP to the user device to indicate whether the PAN has been created. The PAN segment delete request is sent by a PAN host to the AP to terminate the corresponding PAN. The PAN segment delete response is sent by the AP to the PAN host to indicate that the PAN has been terminated. The PAN segment join request is sent by a user device to an AP when the device wishes to join an already established PAN. The PAN segment join response is sent by the AP to the requesting user device to indicate whether the device has been made part of the PAN. The PAN segment leave request is sent by a PAN client to the AP when the PAN client wishes to leave the PAN. The PAN segment leave response is sent by the AP to the requesting PAN client when the client has been removed from the PAN. Other management messages may additionally or alternatively be used.

When a PAN host disconnects from an AP, the AP may automatically terminate the corresponding PAN. In at least one embodiment, when a PAN segment join request is received at an AP from a wireless device, the AP may first ask the PAN host (or user thereof) whether it is okay to allow the requesting device to join the PAN as a PAN client. If the PAN host does not want the device to join the PAN, it may indicate this to the AP and the AP will deny the request.

Figure 2:
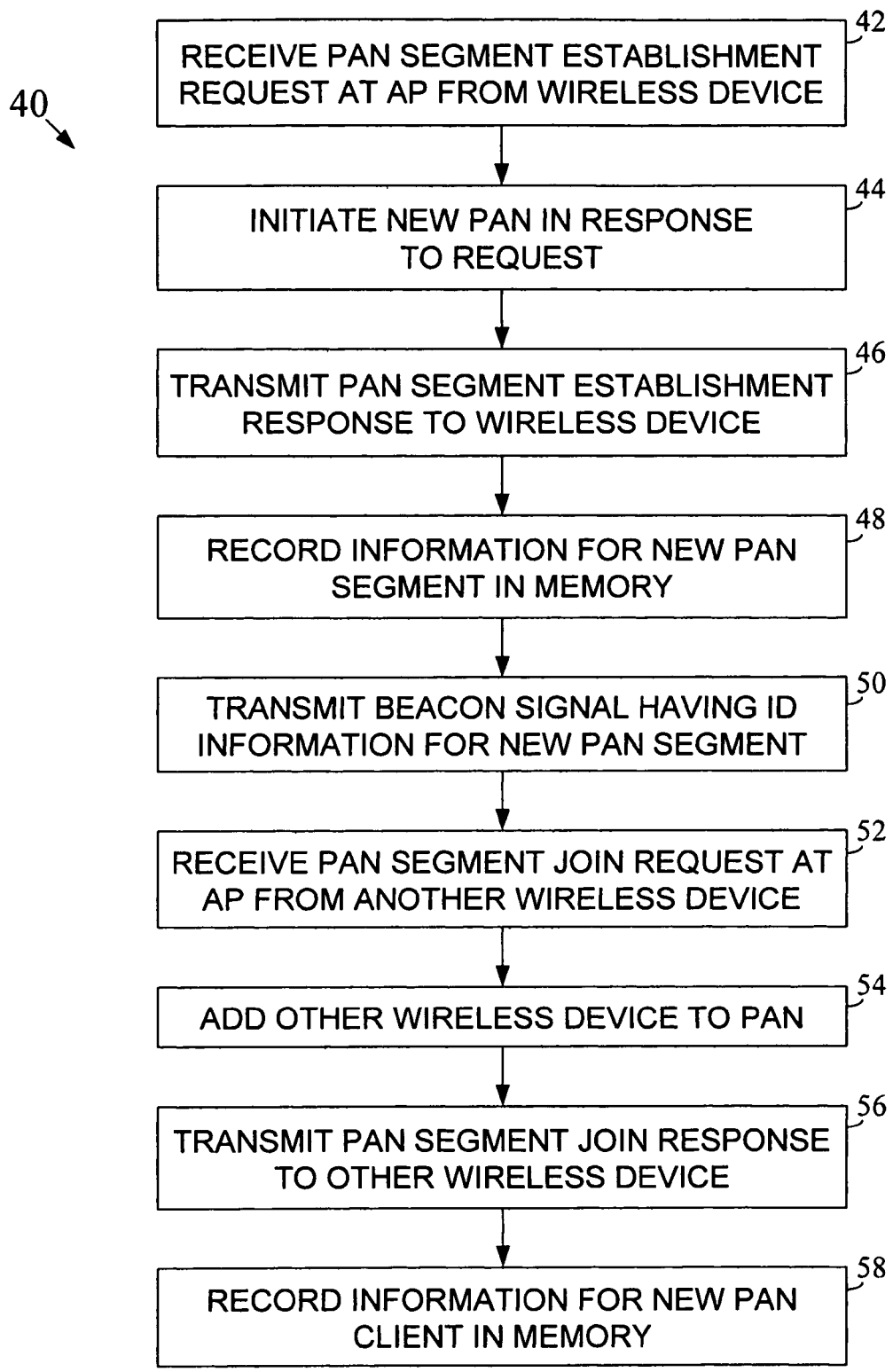
FIG. 2 is a flowchart illustrating an example method for initiating and managing a PAN within a wireless AP in accordance with an embodiment of the present invention.

FIG. 2 is a flowchart illustrating an example method 40 for initiating and managing a PAN using a wireless AP that is also operative for providing access to a LAN in accordance with an embodiment of the present invention. The AP first receives a PAN segment establishment request from a wireless device within range of the AP (block 42). In response to the PAN segment establishment request, the AP initiates a new PAN as a virtual subnet within the network (block 44). The requesting device is made the PAN host of the new PAN segment. The AP then transmits a PAN segment establishment response to the wireless device indicating that the PAN has been established (block 46). The AP will store information about the newly established PAN in a memory for future use (block 48). Any type of memory or digital storage may be used. The AP will then include ID information for the new PAN segment within subsequent beacon signals (block 50). Alternatively, or in addition, the AP will include the ID information of the new PAN segment within subsequent probe response messages. In this manner, other wireless devices within the coverage region of the AP will be informed of the existence of the new PAN.

After the new PAN has been established, another wireless device within the coverage region of the AP may send a PAN segment join request to the AP indicating a desire to join the new PAN segment (block 52). The AP may then add the other wireless device to the PAN (block 54). The other wireless device is now a PAN client. After the new device has been added to the PAN, the AP may send a PAN segment join response to the device indicating that the device is now part of the PAN (block 56). The information stored in the memory for the PAN may be updated with the ID of the new member (block 58). After the new device has joined the PAN, communication may be initiated between the PAN host and the new device. As described previously, the communication may take place through the AP and/or by direct wireless link (e.g., using DLS, etc.). Any of a variety of different medium access techniques may be used by a PAN host or a PAN client to access the medium during PAN-based communication.

In at least one embodiment, after a PAN segment join request is received from a wireless device, an AP will first ask the PAN host whether the requesting device should be allowed to join the PAN before allowing the device to join. If the requesting device is not permitted to join the PAN, the PAN segment join response will indicate a rejection of the join request.

Figure 3:
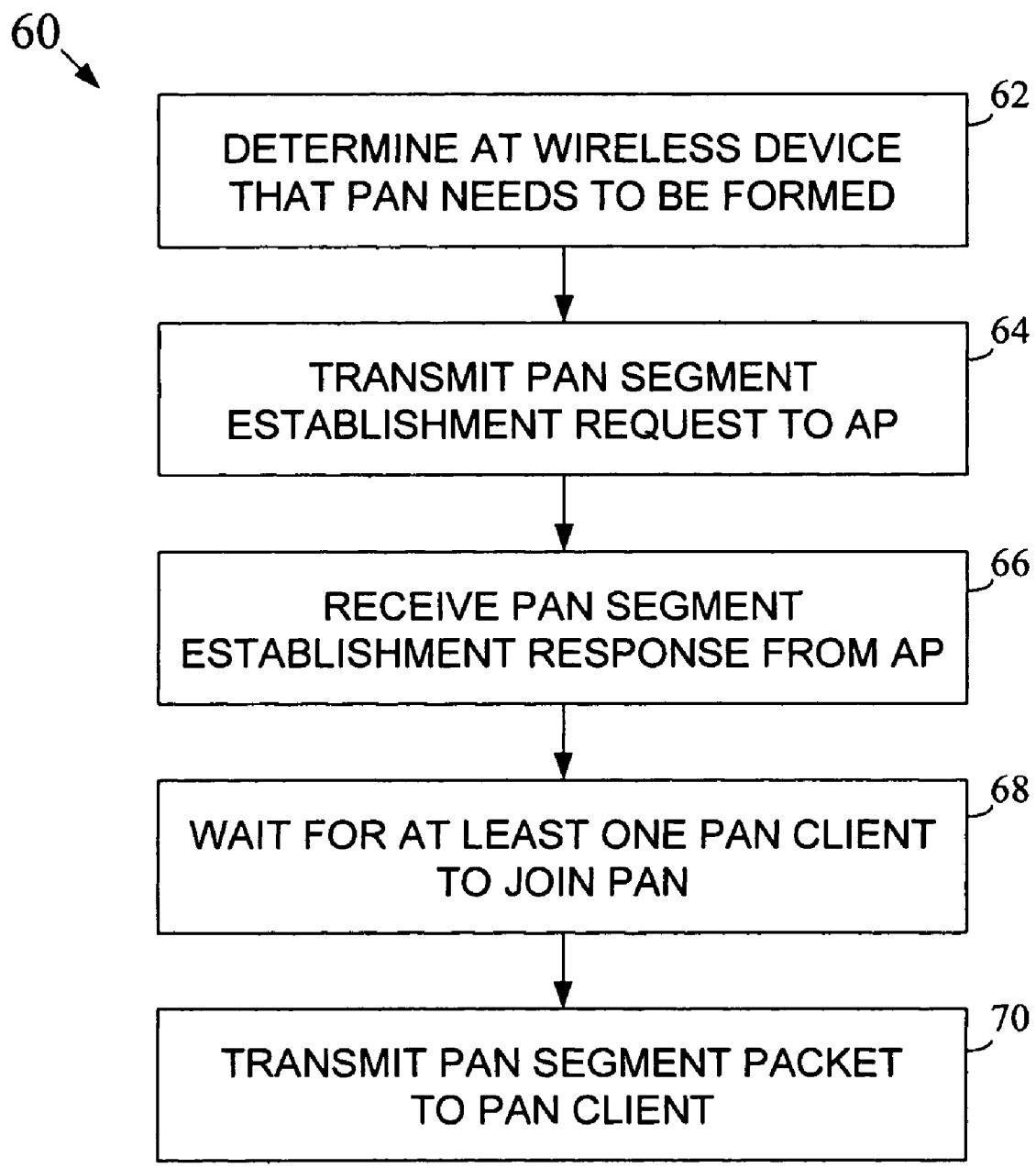
FIG. 3 is a flowchart illustrating an example method for requesting the formation of a PAN from a wireless device in communication with a wireless AP in accordance with an embodiment of the present invention.

FIG. 3 is a flowchart illustrating an example method 60 for requesting the formation of a PAN segment from a wireless device in the vicinity of an AP in accordance with an embodiment of the present invention. The wireless device first determines that a PAN segment needs to be established within the framework of the LAN (block 62). For example, the wireless device may be a PDA associated with a user who wishes to print a document on a local printer having wireless capability. In another example, the wireless device may be a laptop associated with a first user who wishes to transfer a file to the laptop of another user in close proximity. In still another example, the wireless device may be a peripheral that is to perform a service for user devices within a small region. As will be appreciated, many alternative scenarios also exist. After determining that a PAN is needed, the wireless device transmits a PAN segment establishment request to a local AP indicating a desire to establish a PAN (block 64). The wireless device may then receive a PAN segment establishment response indicating whether the PAN was established (block 66). The wireless device may then wait for another wireless device to join the new PAN segment (block 68). After another device has joined the PAN, the first wireless device (i.e., the PAN host) may transmit a PAN segment packet to the new device (block 70).

Figure 4:
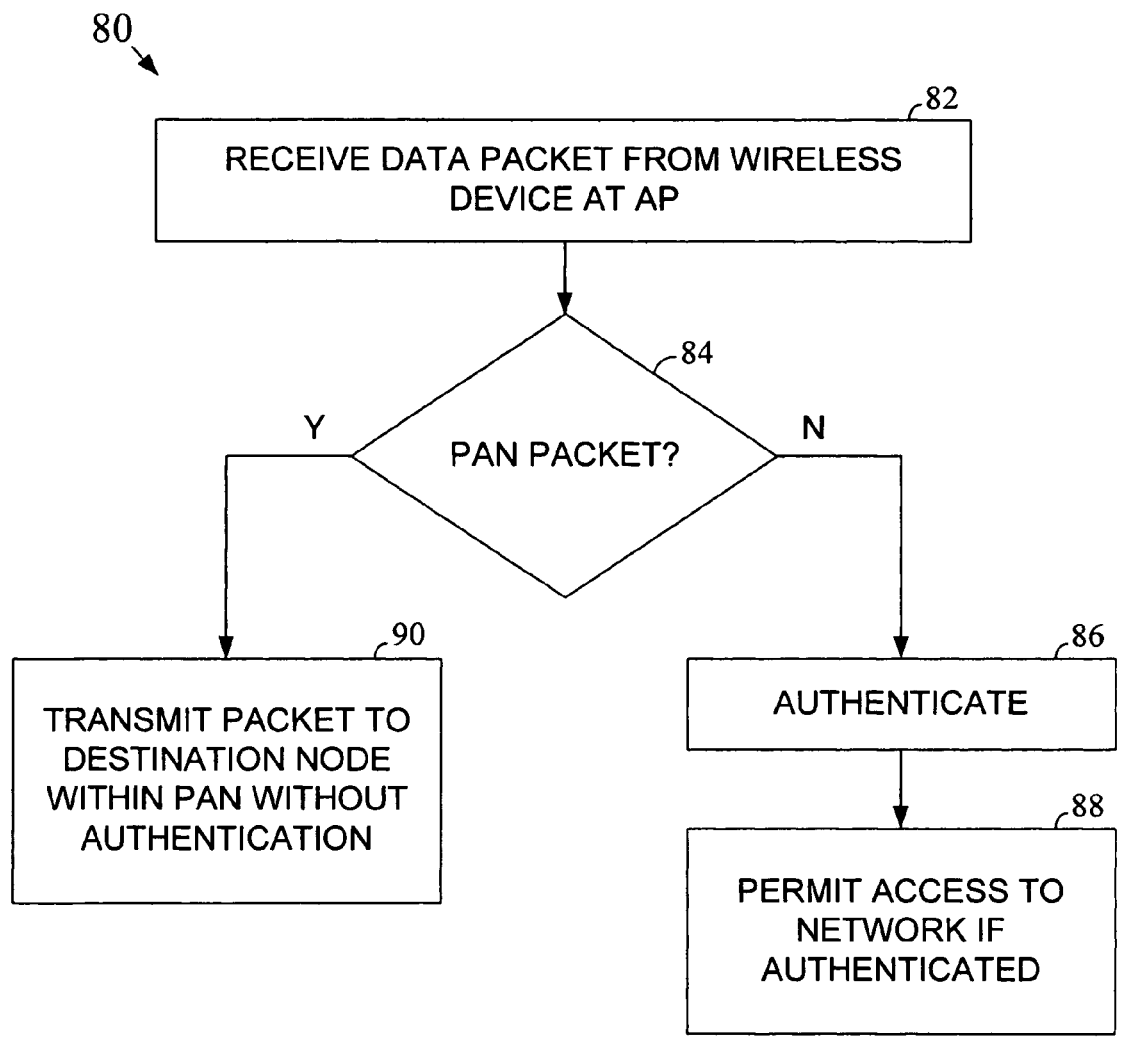
FIG. 4 is a flowchart illustrating an example method for operating a wireless AP in accordance with an embodiment of the present invention.

FIG. 4 is a flowchart illustrating an example method 80 for operating a wireless AP in accordance with an embodiment of the present invention. A data packet is first received from a wireless device at the AP (block 82). The AP then determines whether the packet is a LAN-based packet or a PAN-based packet (block 84). In at least one embodiment, the AP may determine whether the packet is a PAN packet based on whether the packet has a PAN segment ID field. Other techniques may alternatively be used. If the packet is a LAN packet (block 84-N), the AP may determine whether the corresponding device/user has already been authenticated and, if not, the AP will initiate an authentication procedure for the device/user (block 86). Once the device has been authenticated, the AP will then grant the wireless device access to the main network (block 88). If the received data packet is a PAN packet (block 84-Y), the AP may simply re-transmit the packet to a destination node identified within the packet without requiring authentication (block 90). In another possible approach, the AP may perform a different type of authentication for the PAN packet than is used for a LAN packet (e.g., a less complex authentication).

The techniques and structures of the present invention may be implemented in any of a variety of different forms. For example, features of the invention may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. As used herein, the term "logic" may include, by way of example, software or hardware and/or combinations of software and hardware.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
providing access and user authentication at a single wireless access point (AP) to a local area network (LAN) via a Wireless LAN (WLAN) to an at least one wireless device upon receiving a LAN access request from a first wireless device;
determining at a second wireless device that a personal area network (PAN) segment needs to be established;
transmitting a PAN segment establishment request by the second wireless device directly to the AP wherein communication using the WLAN employs an authentication protocol that is different from the PAN;
establishing the requested PAN segment at the AP, wherein the PAN segment is active concurrently with the active LAN coverage;
receiving a PAN segment establishment response from the AP indicating that a PAN segment has been established;
detecting at the AP a request to join the PAN by at least one other wireless device that is currently in direct communication with AP;
joining at the AP the at least one other wireless device to the PAN segment; and
transmitting a PAN segment packet directly from the AP to the at least one other wireless device within the PAN segment, the PAN segment packet including a PAN segment ID field identifying the established PAN segment, wherein the PAN segment is different from the LAN.

2. The method of claim 1, wherein:
the WLAN and the PAN segment use the same wireless standard.

3. The method of claim 1, wherein:
said AP requires a different level of user authentication for a wireless device to access said LAN than to communicate within said PAN segment.

4. The method of claim 1, wherein:
at least one of the second wireless device and the at least one other wireless device can have access to said LAN at the same time that it is a part of said PAN segment.

5. The method of claim 1, wherein:
said first wireless device, said second wireless device, and said AP are each configured in accordance with an IEEE 802.11x wireless networking standard, wherein said PAN segment packet is an IEEE 802.11x packet that is modified to include said PAN segment ID field.

6. The method of claim 1, wherein:
the at least one other wireless device within said PAN segment is not included in within the LAN.

7. The method of claim 1, wherein:
said AP is included within said PAN segment and within the LAN.

8. An apparatus comprising:
a radio frequency (RF) transceiver subsystem; and
a controller coupled to the RF transceiver subsystem, the controller is configured to:
provide an active Wireless Local Area Network (WLAN) coverage to at least one wireless device, wherein the apparatus provides access and user authentication to a local area network (LAN) upon receiving an LAN access request from a first wireless device;
receive a PAN segment establishment request directly from a second wireless device, via the RF transceiver subsystem while actively providing the WLAN coverage, wherein the second wireless device determines that a personal area network (PAN) segment needs to be established;

establish the requested PAN segment, wherein the PAN segment is active concurrently with the active WLAN coverage and the WLAN employs an authentication protocol that is different from the PAN;

transmit a PAN segment establishment response to the second wireless device indicating that a PAN segment has been established;

detect a request to join a PAN from an at least one other wireless device that is currently in direct communication with the RF transceiver subsystem;

join the at least one other wireless device to the PAN segment; and transmit directly cause a PAN segment packet from the apparatus to the at least one other wireless device within the PAN segment, via the RF transceiver subsystem, the PAN segment packet including a PAN segment ID field identifying the established PAN segment, wherein the PAN segment is different from the LAN.

9. The apparatus of claim 8, wherein:
said apparatus can maintain a connection to said LAN at the same time that it is part of said PAN segment.

10. The apparatus of claim 8, wherein:
the said apparatus can communicate within the LAN and the PAN segment using a common wireless networking module using the same wireless standard.

11. The apparatus of claim 8, wherein:
said apparatus and said AP are each configured in accordance with an IEEE 802.11x wireless networking standard, wherein said PAN segment packet is an IEEE 802.11x packet that is modified to include said PAN segment ID field.

12. An article comprising a non-transitory computer readable storage medium having instructions stored thereon that, when executed by a computing platform, operate to:
provide an active Wireless Local Area Network (WLAN) coverage to at least one wireless device, wherein a single wireless access point (AP) provides access and user authentication to a local area network (LAN) upon receiving an LAN access request from a first wireless device;

receive a PAN segment establishment request directly from a second wireless device via an RF transceiver subsystem for the single wireless access point (AP), wherein communication using said WLAN employs an authentication protocol that is different from said PAN;

establish the requested PAN segment, wherein the PAN is active concurrently with the active WLAN coverage, transmit a PAN segment establishment response to the second wireless device indicating that a PAN segment has been established;

detect a request to join a PAN from an at least one other wireless device that is currently in direct communication with the AP;

join the at least one other wireless device to the PAN segment; and transmit directly a PAN segment packet from the AP to the at least one other wireless device within the PAN segment, via the RF transceiver subsystem, the PAN segment packet including a PAN segment ID field identifying the established PAN segment, wherein the PAN segment is different from the LAN.

13. The article of claim 12, wherein:
the at least one other wireless device within said PAN segment is not included in within the LAN.

14. The article of claim 12, wherein:
said AP is included within said PAN segment and within the LAN.

15. A system comprising:
at least one dipole antenna;
a radio frequency (RF) transceiver subsystem coupled to the at least one dipole antenna; and
a controller coupled to the RF transceiver subsystem, the controller is configured to:
provide an active Wireless Local Area Network (WLAN) coverage to an at least the device, wherein the controller provides access and user authentication to a local area network (LAN) upon receiving a LAN access request from a first wireless device;

receive a PAN segment establishment request directly from a second wireless device via the RF transceiver subsystem while actively providing said WLAN coverage, wherein the second wireless device determines that a personal area network (PAN) segment needs to be established;

establish the requested PAN segment, wherein the PAN is active concurrently with the active WLAN coverage;

transmit a PAN segment establishment response to the second wireless device indicating that a PAN segment has been established;

detect a request to join a PAN of an at least one other wireless device that is currently in direct communication with said apparatus;

join the at least one other wireless device to the PAN segment; and transmit directly a PAN segment packet from the apparatus to the at least one other wireless device within the PAN segment, via the RF transceiver subsystem, the PAN segment packet including a PAN segment ID field identifying the established PAN segment, wherein the PAN segment is different from the LAN.

16. The system of claim 15, wherein:
said system can maintain a connection to said LAN at the same time that it is part of said PAN segment.

17. The system of claim 15, wherein:
the apparatus can communicate within the LAN and the PAN segment using a common wireless networking module using the same wireless standard.

18. A method comprising:
providing access and user authentication at a single wireless access point (AP) to a local area network (LAN) via a Wireless LAN (WLAN) to an at least one wireless device upon receiving a LAN access request from a first wireless device;

receiving a PAN segment establishment request directly from a second wireless device at said AP, initiating a new PAN segment in response to said PAN segment establishment request, wherein the PAN segment is active concurrently with the active LAN coverage, and wherein communication using the WLAN employs an authentication protocol that is different from the PAN;

transmitting a PAN segment establishment response directly to said second wireless device from said AP indicating that said new PAN segment has been established; detecting at the AP a request to join the PAN by at least one other wireless device that is currently in direct communication with said AP; and transmitting a beacon signal directly from said AP having identification
information identifying said new PAN segment;
wherein said PAN segment is different from said LAN.

19. The method of claim 18, further comprising:
receiving a PAN segment join request from another wireless device at said AP requesting that said another wireless device be permitted to join said new PAN segment.

20. The method of claim 19, further comprising:
adding said another wireless device to said new PAN segment in response to said PAN segment join request; and
transmitting a PAN segment join response to said another wireless device indicating that said another wireless device has been added to said new PAN segment.

21. The method of claim 18, wherein:
said AP requires user authentication for a wireless device to access said LAN, but does not require user authentication for a wireless device to communicate within said PAN segment.

* * * * *

UNITED STATES PATENT AND TRADEMARK OFFICE
CERTIFICATE OF CORRECTION

PATENT NO. : 8,077,684 B2
APPLICATION NO. : 11/648205
DATED : December 13, 2011
INVENTOR(S) : Izoslav Tchigevsky It is certified that error appears in the above-identified patent and that said Letters Patent is hereby corrected as shown below:

In column 8, line 12, in claim 1, delete "AP" and insert -- AP, --, therefor.

In column 9, line 13, in claim 8, after "directly" delete "cause".

In column 9, line 23, in claim 10, after "the" delete "said".

In column 9, line 47, in claim 12, delete "coverage," and insert -- coverage; --, therefor.

Signed and Sealed this
Twenty-eighth Day of February, 2012

David J. Kappos
*Director of the United States Patent and Trademark Office*